United States Patent
Ryazanova et al.

(10) Patent No.: US 6,802,981 B2
(45) Date of Patent: Oct. 12, 2004

(54) METHOD FOR PURIFICATION AND DISINFECTION OF WATER

(75) Inventors: Natalia Grigorievna Ryazanova, Tomsk (RU); Nikolay Danilovich Ryazanov, Tomsk (RU)

(73) Assignee: Aquapure Technologies Ltd., Kazrine (IL)

( * ) Notice: Subject to any disclaimer, the term of this patent is extended or adjusted under 35 U.S.C. 154(b) by 112 days.

(21) Appl. No.: 10/288,087

(22) Filed: Nov. 5, 2002

(65) Prior Publication Data

US 2004/0084382 A1 May 6, 2004

(51) Int. Cl.[7] .............................. C02F 1/46; C02F 1/52
(52) U.S. Cl. ....................... 210/726; 210/748; 210/806; 210/760; 204/176; 205/756
(58) Field of Search ................................. 210/702, 723, 210/726, 748, 767, 760, 764; 204/164, 176; 205/701, 756

(56) References Cited

U.S. PATENT DOCUMENTS

| | | | |
|---|---|---|---|
| 3,366,564 A | 1/1968 | Allen | |
| 3,402,120 A | 9/1968 | Allen et al. | |
| 3,892,640 A | * 7/1975 | Furuta | 205/755 |
| 4,029,578 A | 6/1977 | Turk | |
| 4,051,034 A | 9/1977 | Amon et al. | |
| 4,077,877 A | 3/1978 | Orensten et al. | |
| 4,352,740 A | 10/1982 | Grader et al. | |
| 4,382,044 A | 5/1983 | Baumgartner et al. | |
| 4,767,528 A | 8/1988 | Sasaki et al. | |
| 4,917,782 A | 4/1990 | Davies | |
| 4,957,606 A | 9/1990 | Juvan | |
| 5,039,423 A | 8/1991 | Kelley | |
| 5,141,652 A | 8/1992 | Moore, Jr. et al. | |
| 5,230,792 A | 7/1993 | Sauska et al. | |
| 5,236,595 A | 8/1993 | Wang et al. | |
| 5,266,216 A | 11/1993 | Agueda et al. | |
| 5,464,513 A | 11/1995 | Goriachev et al. | |
| 5,531,865 A | 7/1996 | Cole | |
| 5,536,403 A | 7/1996 | Sugimoto | |
| 5,620,610 A | 4/1997 | Ishii et al. | |
| 5,630,915 A | 5/1997 | Greene et al. | |
| 5,683,576 A | 11/1997 | Olsen | |
| 5,711,887 A | 1/1998 | Gastman et al. | |

(List continued on next page.)

FOREIGN PATENT DOCUMENTS

| | | |
|---|---|---|
| EP | 0 959 046 A1 | 2/1999 |
| EP | 1 053 976 | 11/2000 |
| RU | 2136600 | 9/1999 |
| RU | 2136601 | 9/1999 |
| RU | 2136602 | 9/1999 |
| RU | 2152359 | 7/2000 |
| SU | 966024 A * | 10/1982 |
| WO | WO 91/11395 | 8/1991 |
| WO | WO 96/32175 | 10/1996 |
| WO | WO 00/12435 | 3/2000 |

OTHER PUBLICATIONS

Derwent Publications Ltd., London, GB; AN 1998–375705 XP002279041.

Primary Examiner—Frank M. Lawrence
(74) Attorney, Agent, or Firm—Green, Burns & Crain, Ltd.

(57) ABSTRACT

A novel system and method for purification and disinfection of water containing contaminates is provided. The system includes an aeration column, a first intermediate tank, a first mechanical filter, an electric discharge device, a second intermediate tank, a second mechanical filter and a sorption filter. The water is firstly aerated by continuous mixing the water with air and ozone-air mixture. The water obtained after the aeration is treated with coagulant materials in a medium of the ozone-air mixture. Further, the water is filtered from coagulated particles. Thereafter, the water is treated by electric discharges in an air medium. The water is then treated again with coagulant materials. Finally, the water is filtered from remaining contaminates.

11 Claims, 5 Drawing Sheets

U.S. PATENT DOCUMENTS

| | | |
|---|---|---|
| 5,728,305 A | 3/1998 | Hawkinson |
| 5,766,488 A | 6/1998 | Uban et al. |
| 6,068,778 A | 5/2000 | Steiner et al. |
| 6,071,473 A | 6/2000 | Darwin |
| 6,146,524 A | 11/2000 | Story |
| 6,149,820 A | 11/2000 | Pedersen |
| 6,251,264 B1 | 6/2001 | Tanaka et al. |
| 6,296,744 B1 | 10/2001 | Djeiranishvili et al. |
| 6,331,321 B1 | 12/2001 | Robbins |
| 6,346,197 B1 | 2/2002 | Stephenson et al. |
| 6,358,407 B1 | 3/2002 | Liao et al. |
| 6,402,945 B1 | 6/2002 | Swales et al. |
| 6,419,831 B2 | 7/2002 | Wang |
| 6,482,327 B1 * | 11/2002 | Mori et al. ............ 210/695 |
| 2003/0029796 A1 * | 2/2003 | Maekawa ............ 210/639 |

* cited by examiner

METHOD FOR PURIFICATION AND DISINFECTION OF WATER

FIELD OF THE INVENTION

This invention relates to a technique for the purification and disinfection of water, and more particular to a system and method for the purification and disinfection of water by a treatment including electrical discharge applied across a water stream.

BACKGROUND OF THE INVENTION

A significant amount of research and development has been undertaken in recent years towards environmental clean-up operations, and in particular to the purification and decontamination of ground water, waste water, and drinking water. A variety of techniques have been used in the prior art to destroy or remove contaminating and toxic materials such as trace organic and inorganic compounds; substances which produce color, taste and odor; pathogenic bacteria; and harmful suspended materials.

These techniques include the use of shock waves created by ultrasonic vibrations and exposing the water to ultraviolet radiation (see, for example, U.S. Pat. No. 6,071,473 to Darwin; U.S. Pat. No. 5,230,792 to Sauska and EP 959046 to Yoshinaga et al.).

Electricity has also been employed as a decontamination agent, such as by introducing positively charged ions into a water stream to cause coagulation and separation of particles, and by the passing of electric current within a fluid chamber (see, for example, U.S. Pat. No. 4,917,782 to Davies; U.S. Pat. No. 5,531,865 to Cole; U.S. Pat. No. 6,346,197 to Stephenson; and U.S. Pat. No. 6,331,321 to Robbins). In this case, the current flowing between the anode and cathode has a toxic effect on microorganisms nearby.

One of the common methods for water disinfection is the use of chlorine as a disinfectant, which is readily available and can be rather easily employed (see, for example, U.S. Pat. No. 4,051,034 to Amon; U.S. Pat. No. 5,039,423 to Kelley; U.S. Pat. No. 5,141,652 to Moore and U.S. Pat. No. 6,296,744 to Djeiranishvili). Chlorine diffuses through the cell wall of the bacterium and operates by disrupting the outer membrane of the cellular organisms, causing organic cellular internal material to spill into the water. However, this method cannot be utilized for purifying water from organic pollutants. The use of chlorine also has its drawbacks because of the formation of compounds that impart a disagreeable taste and odor of the water. In addition, Apart from the unpleasant odor and taste, chlorine also may increase corrosion of water supply pipelines. Additionally, some of chlorine compounds (e.g., trichlorethylene and trihalomethanes), which are also frequently present in the water, are potentially toxic and may pose health hazards.

The utilization of ozone for the purification and disinfection of water is a known and effective technique (see, for example, U.S. Pat. No. 4,352,740 to Grader et al.; U.S. Pat. No. 4,382,044 to Baumgartner; U.S. Pat. No. 4,767,528 to Sasaki et al.; U.S. Pat. No. 5,266,216 to Agueda; U.S. Pat. No. 5,683,576 to Olsen; U.S. Pat. No. 5,711,887 to Gastman et al.; U.S. Pat. No. 6,068,778 to Steiner at al; U.S. Pat. No. 6,146,524 to Story U.S. Pat. No. 6,419,831 to Wang; and U.S. Pat. No. 6,402,945 to Swales et al.). However, it has not yet come into widespread use, such as the general acceptance and widespread use of chlorine.

In recent years, there has been an increased interest in the use of ozone in view of its powerful oxidizing properties and almost instantaneous action, as well as the absence of the formation of a permanent residual material. In particular, ozone has the advantage over chlorine in that it kills bacteria on contact much faster than chlorine and destroys some viruses that are not effected by chlorine. In addition, ozone destroys algae, fungus, mold and yeast spores, oxidizes oils and sulfur, and precipitates metals, e.g., iron, aluminum and manganese. Furthermore, in swimming pool purification systems, the need of periodically adding chlorine to the water and the generally unpleasant effects of chlorine on the eyes and nose make an ozone purification system particularly attractive.

The utilization of hydrogen peroxide injection is also known in the art. This technique in combination with ultraviolet radiation provides for the creation of the —OH radicals necessary to combine with the organic compounds. Notwithstanding that this technique provides effective purification, it did not receive a broad application, mostly due to the strict requirement for high purity hydrogen peroxide and the effects of the inorganic contamination of the surface of ultraviolet lams.

Various techniques for water purification containing organic concomitants based on contacting the water with ozone in the presence of various mixed catalysts are described in U.S. Pat. No. 4,029,578 to Turk; U.S. Pat. No. 5,620,610 to Ishii; U.S. Pat. No. 6,149,820 to Pedersen; and U.S. Pat. No. 6,251,264 to Tanaka.

In particular, the heterogeneous catalyst utilized in U.S. Pat. No. 4,029,578 comprises water insoluble salts, for example, insoluble carbonate, sulfate, oxide, halide or sulfide of such metals as copper, cadmium, and group VIII metals, etc.

According to U.S. Pat. No. 6,149,820, the water enriched with ozone is passed through a catalyst, consisting of activated carbon as the carrier for metal oxides including iron oxide, cobalt oxide, nickel oxides, manganese oxide. Furthermore, the catalyst can contain one or more of the noble metals, e.g., platinum or palladium.

A method for water purification described in U.S. Pat. No. 6,251,264 includes the steps of dispersing photo-catalyst particles and an inorganic coagulant and oxidizing the organic matter contained in the water by activating the photo-catalyst particles by irradiating them with light.

A variety of techniques are known in the art which utilize a filtration process. For example, a filter can be made of a combination of a porous media, activated carbon and ion exchange filters. One of the disadvantages of this water purification technique is that the structure of the filter provides a breeding ground for microorganisms, thereby multiplying the danger. Such techniques, especially effective when used in combination with ultraviolet irradiation, ozonation and chlorination can effectively purify and disinfect the water (See, for example, U.S. Pat. No. 4,077,877 to Orensten et al.; U.S. Pat. No. 5,236,595 to Wang; U.S. Pat. No. 5,536,403 to Sugimoto; U.S. Pat. No. 5,728,305 to Hawkinson; U.S. Pat. No. 5,766,488 to Uban, et al.; and U.S. Pat. No. 6,358,407 to Liao, et al.). However, since activated carbon filters as well as other biological and chemical filters are extremely costly and must be changed regularly, these techniques did not receive wide popularity.

A technique is known in the art, sometimes under the name electro-hydraulics, which utilize high-energy electrical discharge into a volume of liquid for the purpose of disinfecting water, changing chemical constituents and recovering metals and other substances from liquids or slurries (see, for example, U.S. Pat. No. 3,366,564 to Allen;

U.S. Pat. No. 3,402,120 to Allen et al.; and U.S. Pat. No. 4,957,606 to Juvan). According to this technique, an electrohydraulic shock wave within the liquid, intensive light radiation and thermo-chemical reactions are initiated by arc discharge into a spark gap formed by the electrodes immersed in the liquid. One of the drawbacks of this technique is associated with the fact that in the repeated discharging of a high-energy electrical arc across the gap between electrodes, the electrodes are rather rapidly eroded and burned up. Similarly, switching components are consumed by burnup.

U.S. Pat. No. 5,464,513 to Goriachev and U.S. Pat. No. 5,630,915 to Green et al. describes a water purification technique which concurrently uses a synergistic combination of pulsed mechanical shock waves, ultraviolet radiation, and ionization of the water stream, as disinfecting and purification actions within the water to be treated. The water treatment system of this technique includes a pair of electrodes extending transversely across and through a discharge chamber. Contaminated water is introduced into the chamber through an intake port where it passes either through or proximate to the discharge area. A pulse power unit delivers a rapid sequence of arc inducing electrical pulses across the electrodes, thereby producing a series of electric discharge arcs across the discharge area between the electrodes. The arcs are of sufficient energy whereby a plasma inducing arc is sustained through the water across the electrodes, generating lethal levels of ultraviolet radiation, as well as mechanical shock waves having the capacity of directly killing microorganisms and weakening others. Furthermore, molecules of water proximate to the discharge area are broken down into excited radicals, including hydroxyl ions and free oxygen, which combine with organic chemicals to eliminate them from the water stream.

RU Pat. No. 2136600 to Boyev et al. describes a technique for water purification by means of barrier high energy electric discharges formed as a result of the application of a pulsed electric field applied between the electrodes to an air-water mixture formed from water jets and drops. The pulsed electric filed is characterized by the pulse duration shorter than 0.5 microseconds, the slope of the pulse's front greater than $10^9$ V/s and the amplitude of the field strength being in the range of 20–100 kV/cm. For this purpose, the high voltage pulses are applied with the frequency higher than 50 Hz. The frequency magnitude f is selected from the condition $$f \geq 50 \frac{v}{h},$$

where v is the speed of the water flux and h is the height of the electrode system. The values of the pulse parameters were chosen such that the conductivity of the system at these pulse conditions is significantly small, i.e., the water is an electrical insulator.

The electrode system includes a set of electrodes implemented in the form of two combs. One of the combs is coupled to the generator of the high voltage pulses, while the electrodes of the other comb are grounded. The electrodes are covered by an electrical insulating barrier in the form of tubes made of quartz glass.

Various configurations of the electrode system that can be utilized in the device for water purification are disclosed in RU Pat. Nos. 2136601; 2136602 and 2152359 to Ryazanov et al.

In particular, RU Pat. No. 2136601 describes a discharge chamber including a high voltage and grounded electrodes implemented in the form of a volume grid wherein the high voltage electrode is arranged between the grounded electrodes.

RU Pat. No. 2136602 describes an electrode system wherein the grounded electrode is in the form of a cylinder, while the high voltage electrode is in the form of a cylindrical brush which is housed within the ground electrode.

RU Pat. No 2152359 describes a discharge chamber including a high voltage electrode is implemented in the form of a volume grid, while the grounded electrode is configured as a perforated partition implemented in the form of hollow cylinders.

SUMMARY OF THE INVENTION

Despite the extensive prior art in the area of water decontamination techniques, there is still a need in the art for, and it would be useful to have, a novel system and method for water purification and disinfection which is effective both on microorganisms as well as on organic chemicals and chemical toxins.

In addition, it would be advantageous to have an effective system capable to remove substances which produce color, taste and odor as well as to improve organoleptic properties of the water.

The present invention satisfies the aforementioned need by providing a novel system for purification and disinfection of water containing contaminates. The system includes an aeration column, a first intermediate tank, a first mechanical filter, an electric discharge device, a second intermediate tank, a second mechanical filter and a sorption filter.

The aeration column is configured for continuous mixing the water with air and ozone-air mixture The first intermediate tank is configured for receiving the water flowing downwardly from the aeration column and treating the water with coagulant materials in the presence of ozone-air mixture. The first mechanical filter is coupled to the first intermediate tank and arranged for purification of the water from coagulated particles formed in the first intermediate tank. The electric discharge device is arranged downstream of the first mechanical filter and arranged for treatment of the water by electric discharges in an air medium. The second intermediate tank is configured for receiving the water flowing downwardly from the electric discharge device and treating the water with coagulant materials in presents of ozone-air mixture. The second mechanical filter is coupled to the second intermediate tank and arranged for purification of the water from coagulated particles formed at least in the second intermediate tank. The sorption filter is arranged downstream of said second mechanical filter and arranged, inter alia, for purification of the water from organic compounds.

According to one embodiments of the invention, the electric discharge device comprises a discharge chamber bounded by a case. The case includes a water inlet manifold, a gas inlet manifold, a voltage-operated electrode, a grounded electrode; a high voltage pulse power source; a water discharge manifold and a gas discharge manifold adapted for discharging unreacted ozone-air mixture.

The water inlet manifold is arranged for delivering the water into the discharge chamber. The gas inlet manifold is arranged for delivering an oxygenated gas into the discharge chamber. The voltage-operated electrode is insulated from the case by means of a bushing. The grounded electrode is connected to the case, and adapted for bearing the water. According to this embodiment of the invention, the water has a free water surface spaced from the voltage-operated electrode. The high voltage pulse power source is coupled to the voltage-operated electrode and the grounded electrode and configured to supply high voltage pulses thereto. The high-voltage pulses are sufficient to generate a crown electric discharge in the volume between the voltage-operated electrode and the free water surface for producing ultraviolet radiation, ozone, atomic oxygen, excited oxygen molecules, electrons and ions above the water surface, together with OH⁻ radicals, peroxides and protoxides in the water volume. The water discharge manifold is configured for discharging the water treated by the electric discharge. The gas discharge manifold is adapted for discharging unreacted ozone-air mixture.

The amplitude of the voltage pulses is higher than 10 kV (preferably, in the range of 30 kV to 50 kV);

The pulse duration (i.e., pulse length) is shorter than 0.5 microseconds (preferably, in the range of 50 to 200 nanoseconds);

The duration of the pulse's front (i.e., pulse rise time) is shorter than 50 nanoseconds (preferably, in the range of 10 to 20 nanoseconds);

The pulse repetition frequency is higher than 200 Hz (preferably, in the range of 500 to 1500 Hz).

According to one embodiment of the invention, the voltage-operated electrode is configured in the form of a volume grid, while the grounded electrode is in the form of inclined plate, along which the water flows down by gravity. The plate is arranged substantially parallel to the voltage-operated electrode.

According to another embodiment of the invention, the voltage-operated electrode is configured in the form of a volume grid, while the grounded electrode is in the form of a bowl bearing the water. The grounded electrode is arranged below the voltage-operated electrode and connected to the case by means of the water inlet manifold.

According to still another embodiment of the invention, the voltage-operated electrode is implemented as a set of rings connected to a stem via connecting links, while the grounded electrode is configured in the form of a truncated cone. According to this embodiment, the water flows down by gravity along the truncated cone connected to the case. The rings are arranged concentrically to the truncated cone.

The system according to the present invention using the high-energy electric discharge device has a rather high efficiency, with relatively low component cost, very low down time, relatively low power consumption and low plant cost for a relatively high volume throughput.

The aforementioned need is also satisfied by providing a method for purification and disinfection of water containing contaminates. According to one embodiment of the invention, the water is firstly aerated by continuous mixing the water with air and ozone-air mixture. The water obtained after the aeration is treated with coagulant materials. The treating of the water with coagulant materials is carried out in a medium of the ozone-air mixture. Further, the water is filtered from coagulated particles. Thereafter, the water is treated by electric discharges in an air medium. The water is then treated again with coagulant materials. Finally, the water is filtered from remaining contaminates. The final filtering of the water includes transferring the water through a mechanical filter, and thereafter through a sorption filter.

Thus, in accordance with one broad aspect of the invention, there is provided a system for purification and disinfection of water containing contaminates, comprising:

(a) an aeration column configured for continuous mixing the water with air and ozone-air mixture;

(b) a first intermediate tank configured for receiving the water flowing downwardly from said aeration column and treating the water at least with coagulant materials;

(c) a first mechanical filter coupled to said first intermediate tank and arranged for purification of the water from coagulated particles formed in said first intermediate tank;

(d) an electric discharge device downstream of said first mechanical filter arranged for treatment of the water by electric discharges in an air medium;

(e) a second intermediate tank configured for receiving the water flowing downwardly from said electric discharge device and treating the water at least with coagulant materials;

(f) a second mechanical filter coupled to said second intermediate tank and arranged for purification of the water from coagulated particles formed at least in said second intermediate tank.

In accordance with another broad aspect of the invention, there is provided an electric discharge device for water treatment by electric discharges comprising a discharge chamber bounded by a case including:

(i) a water inlet manifold for delivering the water into the discharge chamber;

(ii) a gas inlet manifold for delivering an oxygenated gas into the discharge chamber;

(iii) a voltage-operated electrode insulated from the case by means of a bushing;

(iv) a grounded electrode connected to the case and adapted for bearing the water, said water having a free water surface spaced from said voltage-operated electrode;

(v) a high voltage pulse power source coupled to said voltage-operated electrode and said grounded electrode and configured to supply high voltage pulses thereto;

(vi) a water discharge manifold configured for discharging the water treated by said electric discharge;

(vii) a gas discharge manifold adapted for discharging unreacted ozone-air mixture.

In accordance with still another broad aspect of the invention, there is provided a method for purification and disinfection of water containing contaminates, comprising the steps of:

(a) aerating the water by continuous mixing the water with air and ozone-air mixture;

(b) treating the water obtained after step (a) with coagulant materials;

(c) filtering the water after obtained step (b) from coagulated particles;

(d) treating the water by electric discharges in an air medium;

(e) treating the water obtained after step (d) with coagulant materials; and (f) filtering the water after obtained step (e) from remaining contaminates.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF SPECIFIC EMBODIMENTS

Figure 1:
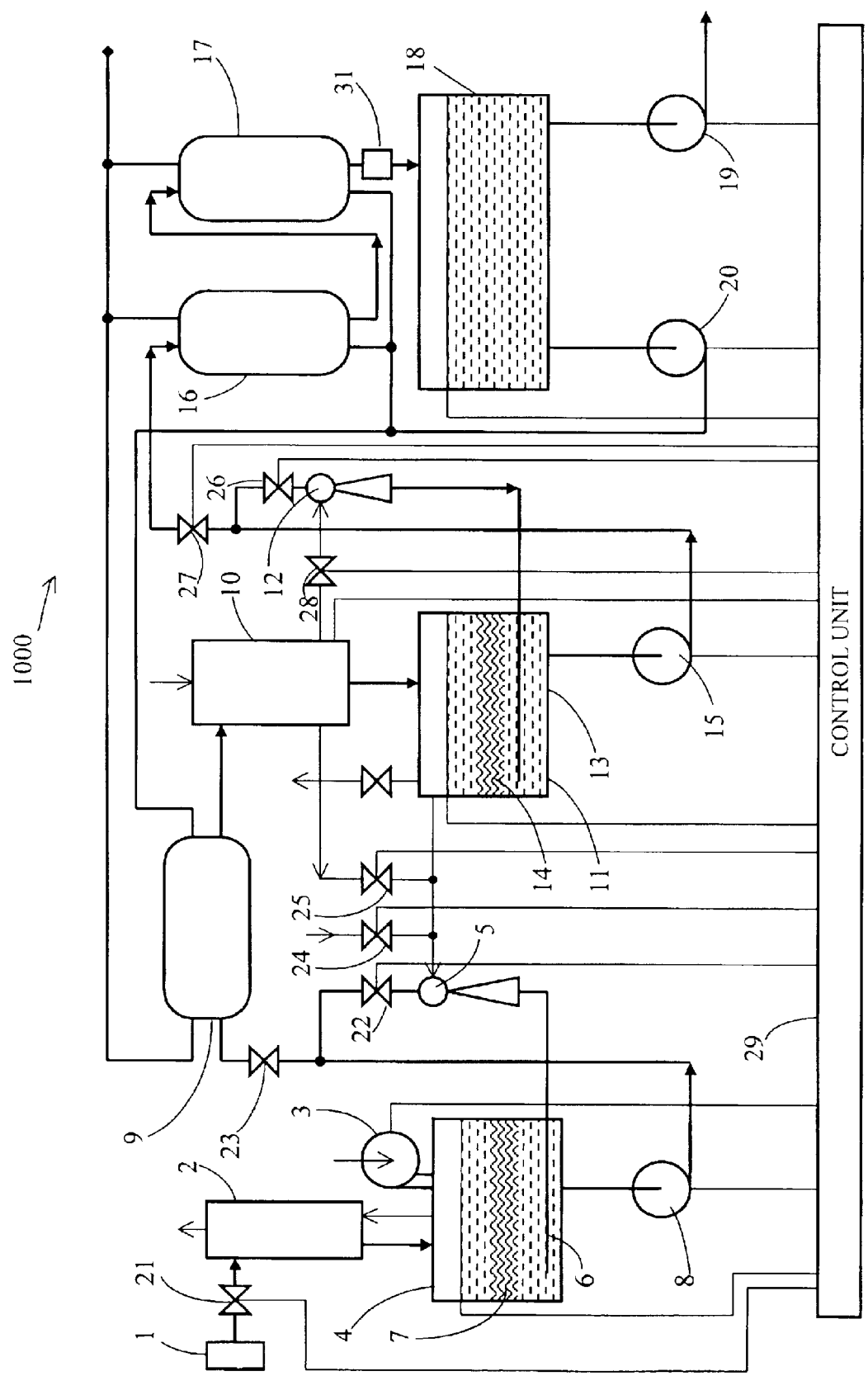
FIG. 1 is a schematic representation of a water purification and disinfection system according to one embodiment of the preset invention.

The principles and operation of the process and system according to the present invention may be better understood with reference to the drawings and the accompanying description, wherein like reference numerals have been used throughout to designate identical elements. It is understood that these drawings are given for illustrative purposes only and are not meant to be limiting.

FIG. 1 is a schematic representation of a multi-stage purification and disinfection system 1000 according to one embodiment of the present invention, wherein the flow of water is illustrated by arrows. In this embodiment, water may be provided from any source 1. The source 1 may be any public or private supply, surface or groundwater, or even collected rainwater which may be stored in cisterns or other storage devices. The water flow may be controlled by an inlet control valve 21 which may also incorporate backflow regulation devices (not shown). The inlet valve 21 may also include a pressure and/or flow sensor (not shown). After passing through the control water valve 21 water enters an aeration column 2 that can be in the configuration of a tower.

The aeration column 2 is a ventilated cooler having one of the following components: Rashig rings, a hurdle packing, or a bulk grid specially made of some neutral material, or a combination of these components. The function of each device (not shown) is known per se, and therefore will not be expounded hereinbelow in details. Each of these devices can be used for the continuous mixing of water with air and ozone-air mixture residues. At the top of the column, water is sprayed by jets (not shown) onto the devices mentioned above, where it is actively and repeatedly mixed with air and ozone-air mixture residues. The water drops and/or jets flow by gravity downwards, while the air and ozone-air mixture residues move upwards.

The air in the aeration column 2 is supplied by any conventional method. For example, it can be provided from the atmosphere by a high-pressure air fan 3. The air fan 3 can be coupled to the aeration column 2 either directly or through a first intermediate tank 4, the purpose of which will further be described below. The ozone-air mixture is provided from an electric discharge device 10 by means of an ejection pump 5 through a distributing system 6, preferably arranged in a bottom portion of the first intermediate tank 4, which causes the gases to be dispersed into the water within the tank 4.

In the aeration column 2 the water saturates with the air oxygen and ozone-air mixture. Under the action of the air oxygen and ozone-air mixture a partial removal of odor and the gases (e.g., hydrogen sulphide, carbonic acid, methane, etc.) dissolved in the water, takes place along with oxidation of the easily oxidizable materials being in the water.

The water treated in the aeration column 2 flows downwardly by gravity into the second intermediate tank 4 that includes a container 7 filled with coagulant and catalyst materials. Examples of the coagulant and catalyst materials include, but are not limited to, metals and metal oxides, which can form hydrates under the action of oxygen, ozone and water. The hydrate products formed thereby can play a role of coagulation centers of oxidized substances.

For example, when a basis for the coagulant is iron, then soluble hydrate $Fe(OH)_2$ together with insoluble $Fe(OH)_3$ hydrate are formed in the oxidation process, to wit:

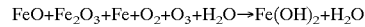

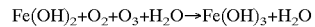

The formation of soluble hydrate $Fe(OH)_2$ results in an increase of water pH which stimulates oxidation reactions and the formation of insoluble hydrate $Fe(OH)_3$, which is a good sorbent that causes oxidized and unoxidized substances to sorb on it. The coagulated particles form a suspended sediment layer which can then partially precipitate in the tank 4, and be further removed, for example, by passing the stream of water through a filter system downstream of the tank 4.

The water from the intermediate tank 4 is supplied for feeding the ejection pump 5 trough a control valve 22 and fed to a first mechanical filter 9 through a control valve 23. The motive force to cause the water to flow is provided by a water pump 8. In the ejection pump 5 water is mixed with the atmospheric air through a valve 24 and/or with the ozone-air mixture residues provided through a control valve 25. The first mechanical filter 9 is arranged for purification of water from the coagulated particles formed in the tank 4. The mechanical filter 9 is a conventional filter, e.g., a trickling filter filled with quartz sand particles having a size distributed in the range of 0.5 mm to 2.5 mm.

The water treated by the first mechanical filter 9 is fed into the electric discharge device 10 designed for water treatment by high-voltage electric discharges in the medium of the gas containing oxygen. In the discharge region, a formation of ozone, atomic oxygen, excited oxygen molecules, electrons and ions takes place above the water surface, while $OH^-$ radicals, various peroxides and protoxides are formed on the water surface and in the water's volume. Additionally, ultraviolet radiation is formed in the discharge region that causes additional water disinfection. The products formed due to the electric discharge interact with dirt materials found in water, that results, for example, in the oxidation of iron, manganese, hydrogen sulphide, organic compounds, and leads to the discoloration and disinfection of water.

It should be also appreciated that the electric discharge device 10, inter alia, is configured for the production of ozone utilized in the aeration column and intermediate tanks. The design and operation of the discharge device 10 will be further described below in detail.

The water treated in the electric discharge device 10 flows downwardly by gravity into a second intermediate tank 11.

The design and purpose of the second intermediate tank 11 is similar to that of the first intermediate tank 4. The water from the intermediate tank 11 is supplied for feeding the ejection pump 12 through a control valve 26 and fed to a second mechanical filter 16 through a control valve 27. The motive force to cause the water to flow is provided by a water pump 15. In the ejection pump 12, water is mixed with the ozone-air mixture residues provided from the discharge device 10 through a control valve 28. The water-ozone-air mixture obtained thereby is supplied to a second distributing system 13 and enters the second intermediate tank 11 in its bottom portion. The second intermediate tank 11 includes a container 14 filled with coagulant and catalyst materials arranged above the second distributing system 13. As was noted above, the hydrate products formed thereby can play a role of coagulation centers of oxidized substances. In turn, due to the movements of large sediment flakes formed as a result of the coagulation in the water's volume, a suspended sediment layer is formed which can then precipitate in the bottom portion of the intermediate tank 11 and be further removed by filtration or discharge.

Water entering the second mechanical filter 16 is released from suspended sediment particles and thereafter enters a sorption filter 17 where the water is then released from organic compounds. The mechanical filter 16 and sorption filter 17 are conventional pressure filters operating at overpressure, both at the input and output. For example, each of the filters can include a sealed reservoir (made of metal or plastic) having a cylindrical design with elliptical bottoms. Inside of the top and bottom parts of these reservoirs there are distribution systems which may differ from each other by their design. As a rule, the bottom distribution system is a radial system of either porous plastic pipes or pipes provided with drain caps, which is a structure with narrow slits and/or small orifices the size of which ensures the retention of filtering or absorbing material. The top distribution system serves for the uniform distribution of water under filtration over the filter section.

The second mechanical filter 16 is charged with quartz sand or zeolite, or any other local mineral material used in the given region. Particles of the sand have a size distributed in the range of 0.5 mm to 2.5 mm. For example, the charging level for quartz sand is not less than 1000 mm. The sorption filter 17 is charged with either activated charcoal or any other sorption or ion-exchange material. The charging level for each material depends on the water type and is recommended by the manufacturer. For instance, a granular activated charcoal can be used for the treatment of water containing organic materials, while ion-exchange resins can be used for the treatment of hard water. The filtering velocity of the mechanical filter 16 is within 5–12 m/hour, while the filtering velocity of the sorption and ion-exchange filer 17 is relatively higher, e.g., within 30–60 m/hour.

The water filtered in the second mechanical filter 16 and the sorption filter 17 flows downwardly by gravity into a clean-water reservoir 18. The resulting product water can then be supplied from the clean-water reservoir 18 to a consumer, use device or any other desired location. The motive force to cause the water to flow to the consumer is provided by a water pump 19.

It should be appreciated that the multi-stage purification and disinfection system 1000 according to the present invention can, inter alia, be utilized for cleaning and sterilizing the water of a swimming pool without the conventional use of chemicals. It can readily be installed in a standard swimming pool plant and is compatible with various types of swimming pool systems.

The system 1000 further includes a water pump 20 arranged for causing the clean water to flow when required in the opposite direction through the first mechanical filter 9, second mechanical filter 16 and the sorption filter 17, for example, for cleaning these filters. The water utilized in cleaning the filters is further supplied to a settling tank (not shown), and thereafter dumped in a sewerage system (not shown) or provided to the input of the system 1000.

The system 1000 is controlled by a control unit 29. The control unit 29 is in communication with several conventional sensing and control devices including, but are not limited to, pressure and/or flow sensors, water quality sensors, the control water valves 22, 23, 24, 25, 26, 27 and 28, water meters, a service indicator (not shown), the water pumps 8, 15, 19 and 20, the ejection pumps 5 and 12, as well as other similar or suitable devices. Each may be a commercially available component. The pressure and/or flow sensors can generate sensor signals for sending information to the control unit 29 to indicate flow and/or pressure levels, and can, for example, be arranged in the control water valves 22, 23, 24, 25, 26, 27 and 28. The water quality sensors can be arranged at any desired location along the water flow. For example, a water quality sensor 31 can be downstream of the sorption filter 17. The water quality sensor 31 can be included to indicate that treatment has been achieved or other quality parameters are met. Examples of the water quality sensor include turbidimeters, biosensors, biological sensors, and other similar, suitable, and conventional devices. The service indicator is an alarm/notification device that can be used to notify the user that service is needed for the system. Each of the exemplary sensing and control devices can be used to provide information to the controller unit to obtain the desired operation of the system. The control unit is configured to generate control signals for controlling, inter alia, flow and/or pressure levels by controlling, for example, water valves 22, 23, 24, 25, 26, 27 and 28, the water pumps 8, 15, 19 and 20, the ejection pumps 5 and 12, as well as other similar or suitable devices.

Figure 2:
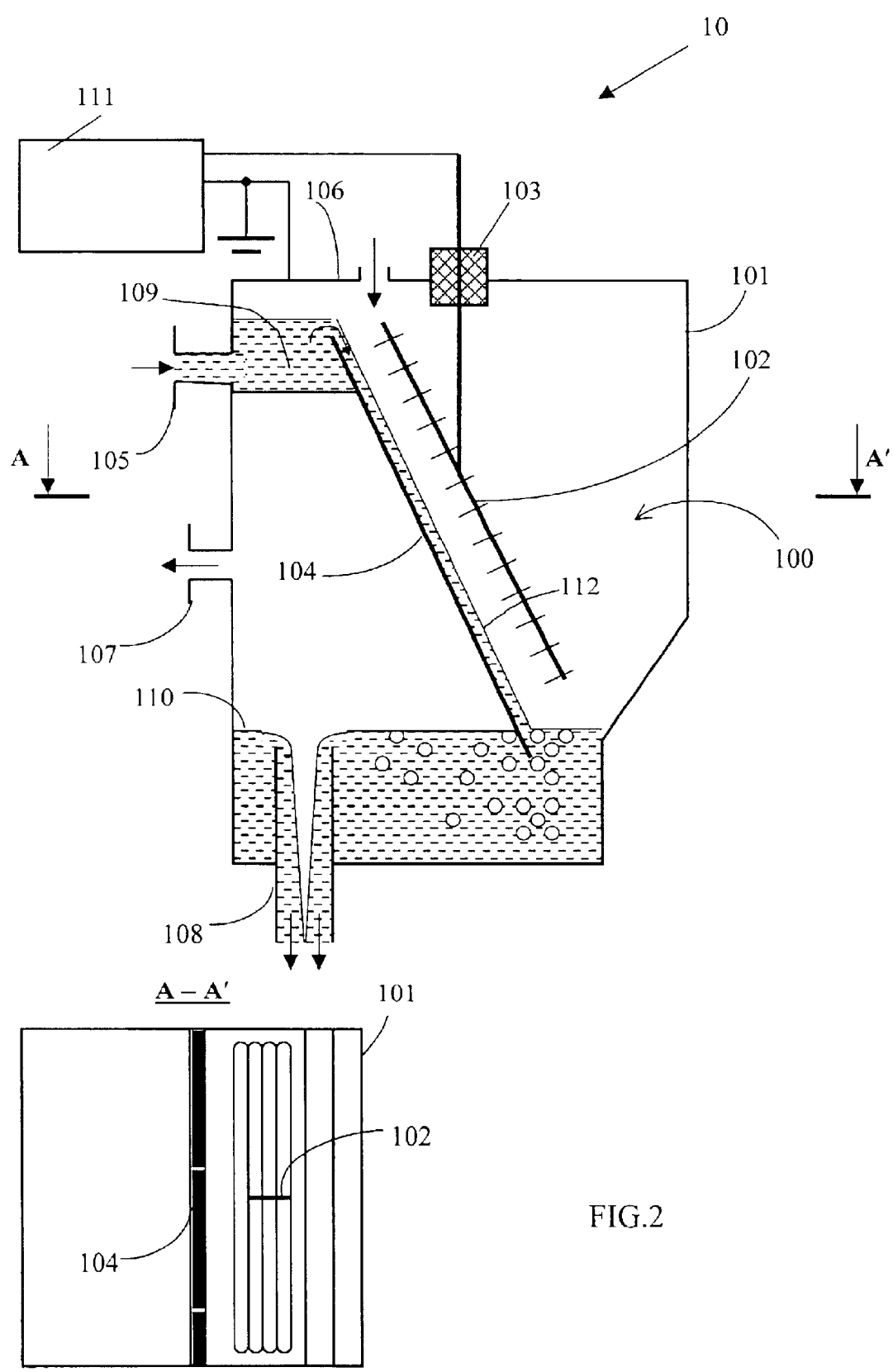
FIG. 2 is a schematic, cross-sectional front and top views of a first embodiment of the discharge device of the water purification and disinfection system shown in FIG. 1 in accordance with the invention.

Turning now to FIG. 2, a first embodiment of the discharge device 10 is illustrated in accordance with the invention. The cross-sectional top view is shown at the level designated by symbols A and A'. The discharge device 10 comprises a discharge chamber 100, which is bounded by a case 101. The case 101, for example, has a cylindrical or partially tapered form and made of metal. The chamber 100 includes a voltage-operated electrode 102 insulated from the case 101 by means of a bushing insulator 103. The bushing insulator 103 is, for example, made of a suitable non-conductive ceramic material. According to this embodiment of the invention, the voltage-operated electrode 102 is configured in the form of a volume grid 109. Below the voltage-operated electrode 102, there is a grounded electrode 104 connected to the case 101 in the electrode's upper portion. According to this embodiment of the invention, the grounded electrode 104 is in the form of an inclined plate arranged substantially parallel to the voltage-operated electrode 102. The electrodes 102 and 104 are connected to a high-voltage pulse power source 111 controlled by the control unit (29 in FIG. 1). An example of the electric scheme and operation of the high-voltage pulse power source 111 will be described in detail below.

The upper portion of the grounded electrode 104, in the place of connection to the case 101, forms a pocket 109 into which the water under treatment flows trough a water inlet manifold 105 from the filter (9 in FIG. 1) and then flows down by gravity along the grounded electrode 104.

At the top section of the case 101, there is a gas inlet manifold 106 which is used for delivering an oxygenated gas (e.g., air). At the bottom section of the case 101 there is a water discharge manifold 108 configured for discharging water treated in discharge device 10 by using a siphon spillway. The water discharge manifold 108 is in communication with the second intermediate tank. 11. As was noted above, water from the electric discharge device 10 flows downwardly by gravity into the second intermediate tank 11 for further treatment.

The discharge device 10 further includes a gas discharge manifold 107 arranged above the water surface 110 that is used for discharging unreacted ozone-air mixture. The gas discharge manifold 107 is in communication with the ejection pump 5 through the valve 25 and with the ejection pump 12 through the valve 28 for supplying ozone-air mixture produced in the discharge device 10 to the intermediate tanks 4 and 11.

When in operation, the water under treatment enters the pocket 109 through the water inlet manifold 105 and moves further down by gravity along the grounded electrode 104 by forming a continues water flow along a surface of the grounded electrode 104. When high voltage pulses are supplied from the high-voltage pulse power source 111 to the voltage-operated electrode 102, electric discharges are formed between the voltage-operated electrode 102 and a water surface 112. The water surface 112 is a free surface, i.e., spaced from said voltage-operated electrode. Such electric discharges are formed along the whole working surface of the grounded electrode 104. The electric discharge is carried out in the form of a pulse crown having the volume that is not smaller than 50% of the volume between the voltage-operated electrode 102 and the water surface 112.

It should be noted that due to the uniform flow of water along the inclined plane of the grounded electrode 104, a uniform agitation of the whole water is carried out. That, in turn, a uniform treatment of the water by electric discharges and thereby leads to improved efficiency of the water purification and disinfection.

Figure 3:
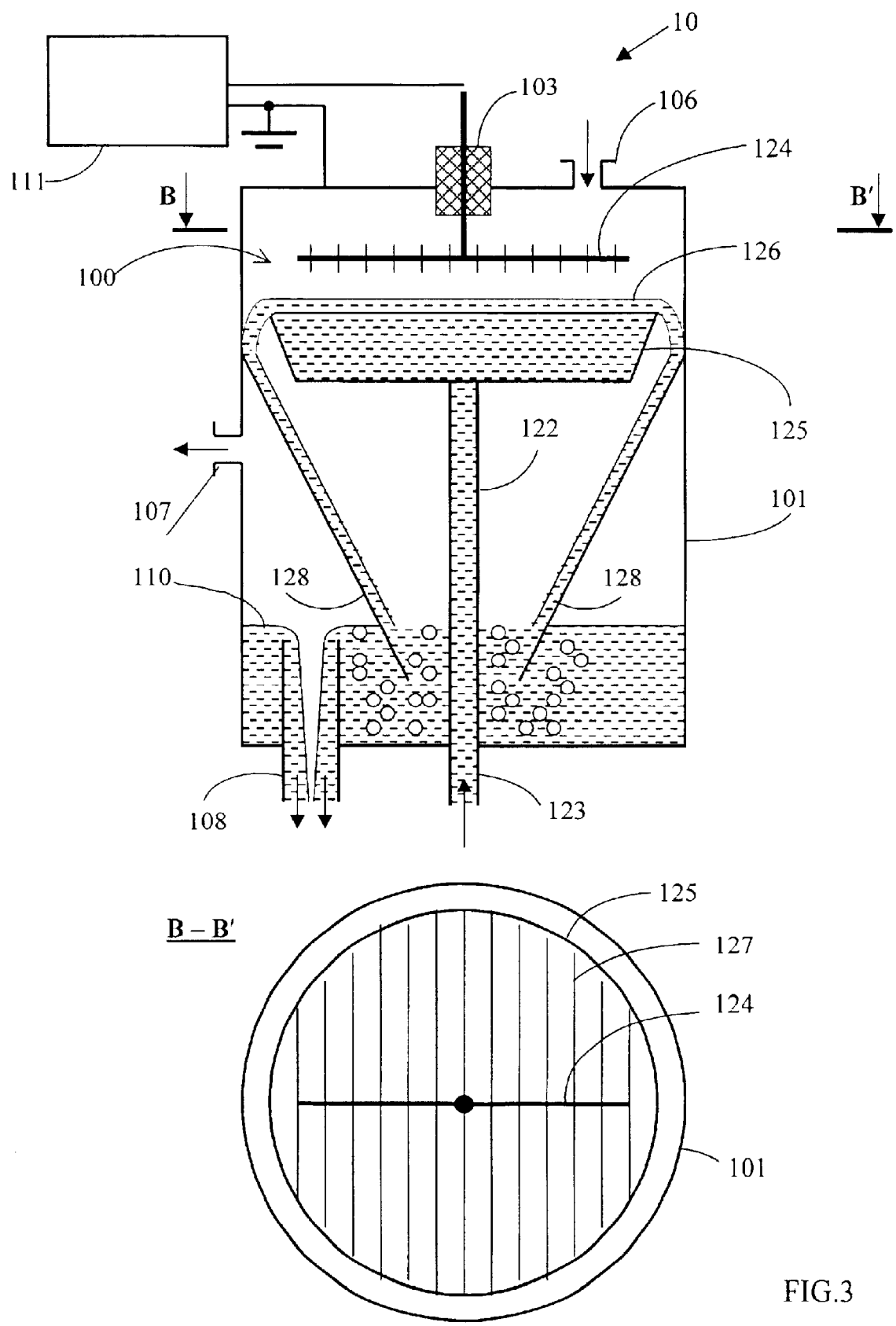
FIG. 3 is a schematic, cross-sectional front and top views of a second embodiment of the discharge device of the water purification and disinfection system shown in FIG. 1 in accordance with the invention.

Referring to FIG. 3, a schematic, cross-sectional front and top views of a second embodiment of the discharge device (10 in FIG. 1) of the water purification and disinfection system (1000 in FIG. 1) is shown in accordance with the invention. The cross-sectional top view is shown at the level designated by symbols B and B'. In FIG. 3, the elements which are similar to the corresponding elements in FIG. 2, are designated by the same reference numerals.

In accordance with this embodiment of the invention, the discharge device 10 comprises a discharge chamber 100, which is bounded by a case 101. For example, the case 101 have a cylindrical form and made of metal. The chamber 100 includes a grounded electrode 122, the upper portion of which is configured in the form of a bowl 125 placed horizontally at the top section of the discharge chamber 100. The bowl 125 can be in any suitable shape, e.g., round, rectangular, etc. The grounded electrode 122 is connected to the case 101 at the bottom section by means of a water inlet manifold 123 delivering the water under treatment into the bowl from the filter (9 in FIG. 1).

The chamber 100 also includes a voltage-operated electrode 124 insolated from the case 101 by means of a bushing insulator 103. According to this embodiment of the invention, the voltage-operated electrode 124 is configured in the form of a volume grid 127 and arranged substantially in parallel with the surface of the water located at the grounded electrode 122.

At the top section of the case 101, there is a gas inlet manifold 106 which is used for delivering the oxygenated gas (e.g., air). At the bottom section of the case 101 there is a water discharge manifold 108 configured for discharging water treated in the discharge device 10 by using a siphon spillway. The water discharge manifold 108 is in communication with the second intermediate tank 11. As was noted above, water from the electric discharge device 10 flows downwardly by gravity into the second intermediate tank 11 for further treatment.

The discharge device 10 further includes a gas discharge manifold 107 arranged above the water surface 110 that is used for discharging unreacted ozone-air mixture. The gas discharge manifold 107 is in communication with the ejection pump 5 through the valve 25 and with the ejection pump 12 through the valve 28 for supplying ozone-air mixture produced in the discharge device 10 to the intermediate tanks 4 and 11.

In operation, the water under treatment enters the bowl 125 trough the water inlet manifold 123. When high voltage pulses are supplied from the high-voltage pulse power source 111 to the voltage-operated electrode 124, electric discharges are formed between the voltage-operated electrode 124 and a surface 126 of the water in the bowl 125. Such electric discharges are formed along the whole working surface of the grounded electrode 124. The upper layer of the water in the bowl 125 moves further down by gravity along a wall of a truncated cone 128 mounted in the case 101 below the bowl 125, and then accumulates at the bottom section of the case 101.

Figure 4:
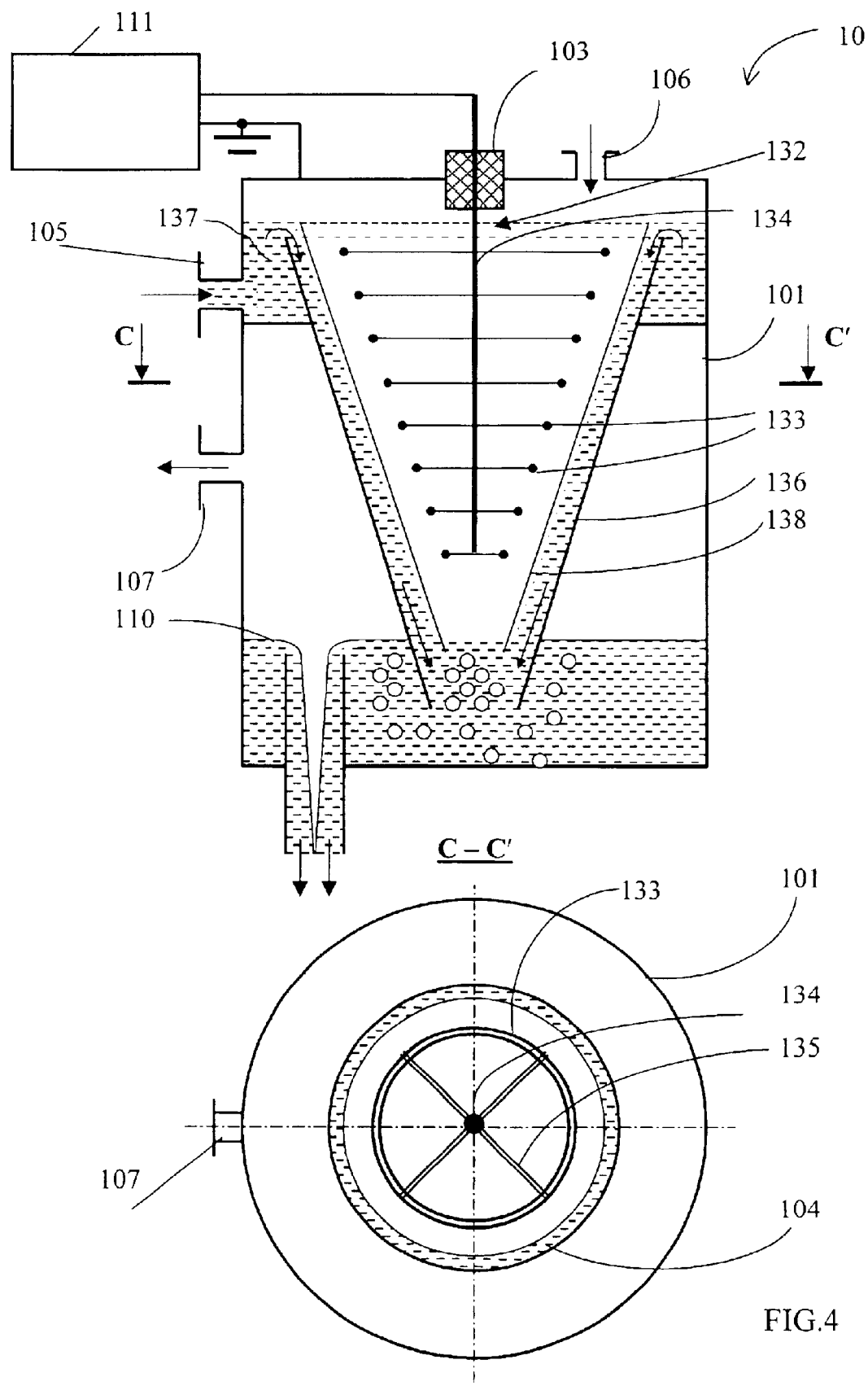
FIG. 4 is a schematic, cross-sectional front and top views of a third embodiment of the discharge device of the water purification and disinfection system shown in FIG. 1 in accordance with the invention.

Referring to FIG. 4, a schematic, cross-sectional front and top views of a third embodiment of the discharge device (10 shown in FIG. 1) of the water purification and disinfection system (1000 in FIG. 1) in accordance with the invention. The cross-sectional top view is shown at the level designated by symbols C and C'. In FIG. 4, the elements which are similar to the corresponding elements shown in FIG. 2 and FIG. 3, are designated by the same reference numerals.

In accordance with this embodiment, the discharge device 10 comprises a discharge chamber 100, which is bounded by a case 101. For example, the case 101 has a cylindrical form and is made of metal. The chamber 100 includes a voltage-operated electrode 132 insulated from the case 101 by means of a bushing insulator 103. The voltage-operated electrode 132 is implemented as a set of rings 133 connected to a stem 134 via connecting links 135, thereby forming a cylindrical comb. The discharge chamber 100 houses a grounded electrode 136 configured in the form of a truncated cone connected to the case 101 in the electrode's upper portion. The electrodes 132 and 136 are connected to a high-voltage pulse power source 111.

According to this embodiment of the invention, the rings 133 are arranged concentrically to the truncated cone. The diameters of the rings 133 are such that distances between the rings 133 and the inner surface of the grounded electrode 136 are all substantially equal.

The upper portion of the grounded electrode 136 together with the case 101 form a pocket 137 into which the water under treatment flows trough a water inlet manifold 105 from the filter (9 in FIG. 1) and then moves down by gravity along the inner surface of the grounded electrode 136.

At the top section of the case 101, there is a gas inlet manifold 106 which is used for delivering the oxygenated gas (e.g., air). At the bottom section of the case 101 there is a water discharge manifold 108 configured for discharging water treated in discharge device 10 by using a siphon spillway. The water discharge manifold 108 is in communication with the second intermediate tank 11. As was noted above, water from the electric discharge device 10 flows downwardly by gravity into the second intermediate tank 11 for further treatment.

The discharge device 10 further includes a gas discharge manifold 107 arranged above the water surface 110 that is used for discharging unreacted ozone-air mixture. The gas discharge manifold 107 is in communication with the ejection pump 5 through the valve 25 and with the ejection pump 12 through the valve 28 for supplying ozone-air mixture produced in the discharge device 10 to the intermediate tanks 4 and 11.

In operation, the water under treatment enters the pocket 137 through the water inlet manifold 105 and moves further down by gravity along the inner surface of the grounded electrode 136 by forming a continues water flow along a surface of the grounded electrode 136. When high voltage pulses are supplied from the high-voltage pulse power source 111 to the voltage-operated electrode 132, electric discharges are formed between the voltage-operated electrode 132 and a water surface 138. Such electric discharges are formed along the whole working surface of the grounded electrode 136. The electric discharge is carried out in the form of a pulse crown having the volume that is not smaller than 50% of the volume between the voltage-operated electrode 132 and the water surface 138.

It should be appreciated that any suitable material may be used to make the electrodes of the present invention. In order to limit deposition and corrosion reactions at the electrodes, it is preferred to select a material that is highly conductive, but non-reactive, in a water environment. Examples of the electrodes include, but are not limited to, carbon electrodes, ceramic electrodes, metallic electrodes, carbon/ceramic ash electrodes, and other similar, suitable, or conventional types of electrodes.

According to one embodiment of the invention, the high voltage pulses supplied to the voltage-operated electrodes (102, 121 and 132) have the following characteristics:

The amplitude of the voltage pulses is higher than 10 kV (preferably, in the range of 30 kV to 50 kV);

The pulse duration (i.e., pulse length) is shorter than 0.5 microseconds (preferably, in the range of 50 to 200 nanoseconds);

The duration of the pulse's front (i.e., pulse rise time) is shorter than 50 nanoseconds (preferably, in the range of 10 to 20 nanoseconds);

The pulse repetition frequency is higher than 200 Hz (preferably, in the range of 500 to 1500 Hz).

Due to the fact that the duration of the voltage pulses supplied to the discharge device is rather short and the temperature of the discharge is relatively low, the technique of the invention is characterized by relatively small formation of nitrogen oxides ($NO$, $NO_2$, $NO_3$ and $N_2O_5$).

It should be appreciated that a preferable distance between the voltage-operated electrodes and the water surface (112, 126 and 138) depends on the characteristics of the electric power supply. For example, in the case of a pulse power supply with the voltage pulses having the magnitude in the range of about 40 kV to 45 kV this distance can be in the range of about 40 mm to 50 mm. A change in power of the voltage source, for example, from 1 kW to 5 kW (at equal magnitudes of the voltage pulses) can necessitate enlarging the area of the high-voltage electrode by 1–5 times, in order to ensure optimum current density. For example, the specific power applied to the electrode is in the range of about 400÷800 W/m².

In the zone of electric discharge treatment, the oxygenated gas gives rise to the formation of ozone ($O_3$), atomic oxygen ($O^-$), excited oxygen molecules ($O_2+h\nu$) and electrons and ions ($e+O_{2-}+N_-+H_2O_-+N_+$etc.). Additionally, the ultraviolet radiation generated in the discharge volume leads to a break-up of ozone molecules on the molecular and atomic of oxygen ($O_3 \rightarrow O_3+O$).

Furthermore, the formation of radicals ($OH^-$) and various hydrogen peroxides and protoxides ($H_2O_2$, $H_2O$—) under the influence of electrons and ions is carried out on the water surface and in water volume. In the bottom portion of the case 101 of the discharge device 10, the active ozone-gas mixture is mixed with the water treated on the grounded electrode (104, 122 and 136). The products formed due to the electric discharge interact with dirt materials being in water, that results, for example, in oxidation of inorganic compounds (e.g., iron, manganese, hydrogen sulphide), organic compounds (e.g., phenol), as well as leads to decoloration and disinfection of water.

Due to the fact that the electrochemical oxidation potential of the substances formed during the electric discharge treatment is as follows: hydroxyl radicals is 2.8 V, atomic oxygen is 2.42 V, ozone is 2.08 V, hydrogen peroxide is 1.78 V and molecular oxygen is 1.23 V, the efficiency of the suggested method is relatively high. In other words, the water purification and disinfection processes in the technology of the present invention are characterized by relatively great activity and low power inputs. In particular, the efficiency can be higher than that of the conventional ozonation method in which a barrier discharge is used for ozone-air mixture preparation and further ozone-air mixture dilution in water. Additionally, the technique of the invention is characterized by the absence of a solid dielectric in the discharge gap that results in power-saving due to the lack of dielectric losses.

Figure 5:
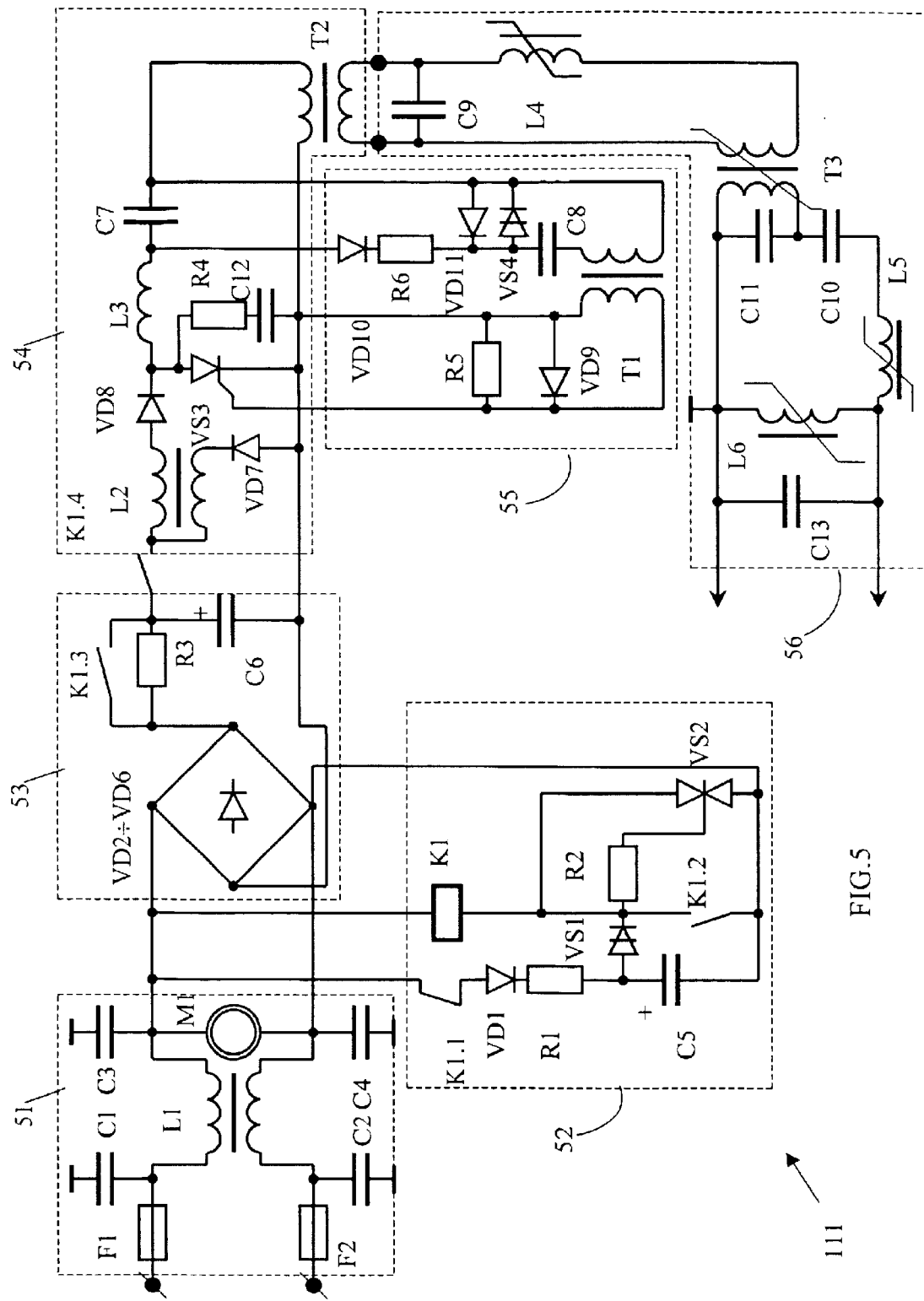
FIG. 5 is a schematic representation of a high-voltage pulse power source, in accordance with one embodiment of the invention.

Referring to FIG. 5, a schematic representation of the high-voltage pulse power source (111 in FIGS. 2–4) is illustrated, in accordance with one embodiment of the invention. The high-voltage pulse power source includes a supply-line filter 51, a delay unit 52, a rectifier 53, a pulse modulator 54, a control unit 55 and a magnetic compression unit 56.

The supply-line filter 51 is adapted to be connected to the electric mains (not shown) and comprises elements F1, F2, C1, C2, C3, C4, L1. The supply-line filter 51 is configured for protection of mains supply from the commutation stray pick-up caused by the operation of a high-power thyristor VS3 and magnetic commutators L5 and L6 in the magnetic compression unit 56. The supply-line filter 51 can include a ventilator M1 arranged for cooling the thyristor VS3.

The delay unit 52 is assembled from elements K1, VD1, VS1, VS2, R1, R2, C5. The unit 52 can delay a switch of the modulator 54 and configured for the slow charging of capacitor C6 of the rectifier 53 and protection of the rectifier 53 from the current inrush at power-up.

The rectifier 53 is configured for rectification of the mains voltage. The rectifier 53 is assembled as a bridge circuit from elements VD2, VD3, VD4, VD5, VD6 with a T-circuit of a capacitive filter assembled from R3, C6. The resister R3 is configured for the slow charging of capacitor C6 of the rectifier 53 only at the initial moment of the switch of power supply, and does not participate in the principal activity of the discharge device 10.

The pulse modulator 54 can operate with a total discharge of reservoir capacitor C7. The pulse modulator is assembled from elements L2, L3, VD7, VD8, VS3, R4, C7, C12, T2 and configured for formation of a primary low-voltage pulse and relaying this pulse to the magnetic compression unit 56.

The control circuit 55 is configured for control of the thyristor VS3. The control circuit 55 is assembled from elements R5, R6, VD9, VD10, VD11, VS4, C8, T1 and can open the power thyristor VS3 with a required frequency.

The magnetic compression unit 56 is assembled from elements C9, C10, C11, C13, L4, L5, L6, T3 and configured for amplification and time compression of the amplitude of the pulse voltage, and matching of the high-voltage pulse power source with a load (not shown).

In operation, when the mains is connected to the high-voltage pulse power source, the capacitor C6 is charged to the voltage of around 300 V–310 V over 1–2 seconds through the supply-line filter 51, rectifier 53 and resistor R3. In turn, the capacitor C5 is charged to the voltage of around 100 V (the threshold voltage for opening the dinistor VS1) over 3–5 seconds through the diode VD1 and resistor R1. Thereafter, the capacitor C5 is coupled to the control terminal of the symistor VS2 for its opening, and thereby closing the power supply circuitry of the starter K1.

In this case, the switch K1.2 shunts the symistor VS2, the switch K1.3 shunts the resistor R3 and the switch K1.1 breaks the power supply circuit of the delay unit 52, while the switch K1.4 couples the modulator 54 to the capacitor C6. The capacitor C7 is charged to the voltage of around 500 V through the coils L2, L3 and the diode VD8, while the excess energy is returned to the capacitor C6 through the diode VD7. The voltage across the capacitor C7 is a power source of the control unit 55 adapted for control of the opening of the thyristor VS3. When the thyristor VS3 is opened, the capacitor C7 transfers its energy to the capacitor C9 through the pulse transformer T2.

As the charging of the capacitor C9 proceeds, the magnetic key L4 magnetizes, and after its saturation, the capacitor C9 transfers its energy to the capacitors C10 and C11 through the transformer T3 together with re-magnetizing the cores of the magnetic keys L5 and L6. As the charging of the capacitor C11 proceeds, the transformer core of the transformer T3 magnetizes, and after its saturation, the capacitor C11 recharges through the secondary winding of the transformer T3 and changes its polarity. At the same time, the core of the magnetic key L5 magnetizes, and after the saturation, the capacitors C10 and C11 discharge into the capacitor C13 and the load (not shown).

The value of the capacitor C13 is selected according to the capacitance of the system formed by the voltage-operated electrodes (102, 121, 132) and grounded electrodes (104, 122, 136) and configured for optimal transformation of the energy to the load. The magnetic key L6 is configured for closing the circuit of the discharge of the capacitors C10, C11 and for cutting the voltage pulse when the high-voltage pulse power source 111 is idling or has high-resistance loads.

It should be appreciated that the high-voltage pulse power source, according to this embodiment of the invention, enables not only to generate high-voltage pulses, but also perform a time compression of these pulses, due to the utilization of, inter alia, the saturating magnetic elements L4, T3 and L5. In particular, the duration of the pulse front can be decreased up to tens of nanoseconds, while the pulse duration can be decreased up to hundreds of nanoseconds. Such parameters allow to receive a quasi-volume discharge (i.e., when the volume of the discharge occupies a substantial region between the electrodes), and thereby increase efficacy of water purification and disinfection at lower power inputs.

According to a preferred embodiment of the invention, the specification of the elements of the high-voltage pulse power source 111 is presented in Table 1.

TABLE 1

| Indication | Name and Type | Number | Note |
|---|---|---|---|
| F1, F2 | Safety device (fuse) PK 45-2 A | 2 | |
| VD1, VD11 | Diode KD 226 B | 2 | |
| VD2–VD6 | Diode KD 202 R | 5 | |
| VD7 | Diode 2 × KD 203 D | 1 | 2 diodes in series |
| VD8 | Diode 2 × KD 203 D | 1 | 2 diodes in series |
| VD9 | Diode KD 213 A | 1 | |
| VS1, VS4 | Stabilitron KN 102 ZH | 2 | |
| VS2 | Dinistor KU 208 G | 1 | |
| VS3 | Thyristor TB 271-200-12-652 | 1 | |
| K1 | Starter PME-011 | 1 | |
| M1 | Ventilator VN 2 | 1 | Ventilator for cooling the thyristor VS3. |
| C1–C4 | Capacitor KBPF-0.22 microfarad-600 V-20 A | 4 | Feed-through interference suppression capacitor |
| C5 | Capacitor K 50-35-47.0 microfarad-450 V | 1 | |
| C6 | Capacitor K 50-59-1500.0 microfarad-360 V | 1 | |
| C7 | Capacitor K 78-12-2.2 microfarad-1000 V | 1 | |
| C8 | Capacitor 2 × K 78-2-0.047 microfarad-1000 V | 1 | 2 capacitors connected in parallel |
| C9 | Capacitor K 78-12-0.47 microfarad-1600 V | 1 | |
| C12 | Capacitor 2 × K 78-2-0.039 microfarad-1000 V | 1 | 2 capacitors connected in parallel |
| R1 | Resistor MLT-2-10 k$\Omega$ ± 10% | 1 | |
| R2 | Resistor MLT-1-1 k$\Omega$ ± 10% | 1 | |
| R3 | Resistor 2 × PEV-10-820 $\Omega$ ± 10% | 1 | 2 resistors connected in parallel |
| R4 | Resistor 2 × PEV-15-750 $\Omega$ ± 10% | 1 | 2 resistors connected in parallel |
| R5 | Resistor MLT-2-51 $\Omega$ ± 10% | 1 | |
| R6 | Resistor 6 × MLT2-130 k$\Omega$ | 1 | 6 resistors connected in parallel |
| R7 | Resistor MLT-2-100 k$\Omega$ ± 10% | 1 | |
| R8 | Resistor MLT-2-1 k$\Omega$ ± 10% | 1 | |
| R9 | Resistor MLT-2-100 k$\Omega$ ± 10% | 1 | |
| R10 | Resistor MLT-2-1 k$\Omega$ ± 10% | 1 | |
| L1 | Supply-line filter choke n = 5 ÷ 10 (two cables connected in parallel) | 1 | Ferrite ring Ø 100 × 60 × 15 model M 1000HH3 |
| L2 | Charging-discharging choke n1 = 180 n2 = 200 ÷ 220 | 1 | 4 × PP 40 × 17 × 18 ferrite 2500 NMS (4 U-form ferrites that form 2 windows inside of which there are windings) |
| L3 | Air solenoid (surveyor's chain of tank C7) | 1 | The number of coils is selected when tooling. |
| L4 | Saturable choke | 1 | Ferrite ring Ø 125 × 80 × 12 model M 1000HH3. The number of coils is selected when tooling. |

TABLE 1-continued

| Indication | Name and Type | Number | Note |
|---|---|---|---|
| T1 | Pulse transformer $n_1 = 50$ $n_2 = 5$ | 1 | Thyristor VS3 trigger circuit matching transformer. Ferrite ring K40 × 25 × 7.5 600HH8 2, two rings are connected in parallel. |
| T2 | Pulse matching transformer $k = 2.5$ | 1 | Non-saturable transformer on a ferrite ring 200 VNP Ø 125 × 80 × 18. The number of coils is selected when tooling. |
| C10 | Capacitor 3 × K 15 U1-100.0 picofarad-20 kilovolt | 1 | 3 capacitors connected in parallel |
| C11 | Capacitor 3 × K 15 U1-100.0 picofarad-20 kilovolt | 1 | 3 capacitors connected in parallel |
| C13 | Capacitor K 15 U1 | | Selected when tooling. |

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

It should be understood that the described above configuration of the the high-voltage pulse power source 111 represents only one of various ways in which the required high-voltage pulses are provided and that various other configurations, as well as other methods, may be utilized to provide the desired power supply to the electric discharge device 10.

Also, it is to be understood that the phraseology and terminology employed herein are for the purpose of description and should not be regarded as limiting.

It is important, therefore, that the scope of the invention is not construed as being limited by the illustrative embodiments set forth herein. Other variations are possible within the scope of the present invention as defined in the appended claims and their equivalents.

What is claimed is:

1. A method for purification and disinfection of water containing contaminates, comprising the steps of:

(a) aerating the water by continuous mixing the water with air and ozone-air mixture;

(b) treating the water obtained after step (a) with coagulant materials;

(c) filtering the water after obtained step (b) from coagulated particles;

(d) treating the water by electric discharges in an air medium;

(e) treating the water obtained after step (d) with coagulant materials; and (f) filtering the water after obtained step (e) from remaining contaminates.

2. The method of claim 1 wherein treating the water with coagulant materials is carried out in a medium of the ozone-air mixture.

3. The method of claim 1 wherein treating the water by electric discharges includes providing high-voltage pulses sufficient to generate a crown electric discharge for producing at least one product from the following: ultraviolet radiation, ozone, atomic oxygen, excited oxygen molecules, electrons and ions above the water surface, along with OH$^-$ radicals, peroxides and protoxides in the water volume.

4. The method of claim 3 wherein the amplitude of said high voltage pulses is higher than 10 kV.

5. The method of claim 3 wherein the length of said high voltage pulses is shorter than 0.5 microseconds.

6. The method of claim 3 wherein the pulse repetition frequency is higher than 500 Hz.

7. The method of claim 3 wherein the pulse rise time is shorter than 50 nanoseconds.

8. The method of claim 1 wherein the filtering of the water includes transferring the water through a mechanical filter.

9. The method of claim 8 wherein the filtering of the water further includes transferring the water through a sorption filter.

10. The method of claim 1 wherein said coagulant materials are selected from metals and metal oxides which can form hydrates under the action of oxygen, ozone and water.

11. The method of claim 1 wherein said coagulant materials are selected from the following materials: iron and iron oxides.

* * * * *